United States Patent [19]

Ludewig et al.

[11] Patent Number: 5,001,721
[45] Date of Patent: Mar. 19, 1991

[54] APPARATUS FOR PURIFYING LASER GAS

[75] Inventors: Rüdiger Ludewig; Frank Voss, both of Göttingen, Fed. Rep. of Germany

[73] Assignee: Lambda Physik Forschungs- und Entwicklungsgesellschaft mbH, Gottingen, Fed. Rep. of Germany

[21] Appl. No.: 421,162

[22] Filed: Oct. 13, 1989

[30] Foreign Application Priority Data

Jun. 16, 1989 [DE] Fed. Rep. of Germany ....... 3919771

[51] Int. Cl.⁵ .............................................. H01S 3/22
[52] U.S. Cl. ......................................... 372/59; 372/35
[58] Field of Search ..................... 372/58, 59, 34, 35, 372/61

[56] References Cited

U.S. PATENT DOCUMENTS

| | | | |
|---|---|---|---|
| 4,500,998 | 2/1985 | Kuwabara et al. | 372/58 |
| 4,601,040 | 7/1986 | Andrews et al. | 372/35 |
| 4,752,937 | 6/1988 | Gorisch et al. | 372/61 |
| 4,779,284 | 10/1988 | Nissen | 372/61 |
| 4,825,445 | 4/1989 | Koop et al. | 373/58 |
| 4,833,685 | 5/1989 | Boscolo et al. | 372/35 |
| 4,887,270 | 12/1989 | Austin | 372/35 |

Primary Examiner—Léon Scott, Jr.
Attorney, Agent, or Firm—Hedman, Gibson, Costigan & Hoare

[57] ABSTRACT

An apparatus for purifying laser gas comprises first and second tubes 20, 22 in good thermal contact, liquid nitrogen flowing through the first tube 20 and laser gas flowing through the second tube 22. The laser gas is precooled in an arrangement of third and fourth tubes 24, 26, the laser gas to be cleaned entering the third tube 24 which opens into the second tube 22 so that precooled laser gas enters the second tube which opens into the fourth tube to effect the precooling.

8 Claims, 3 Drawing Sheets

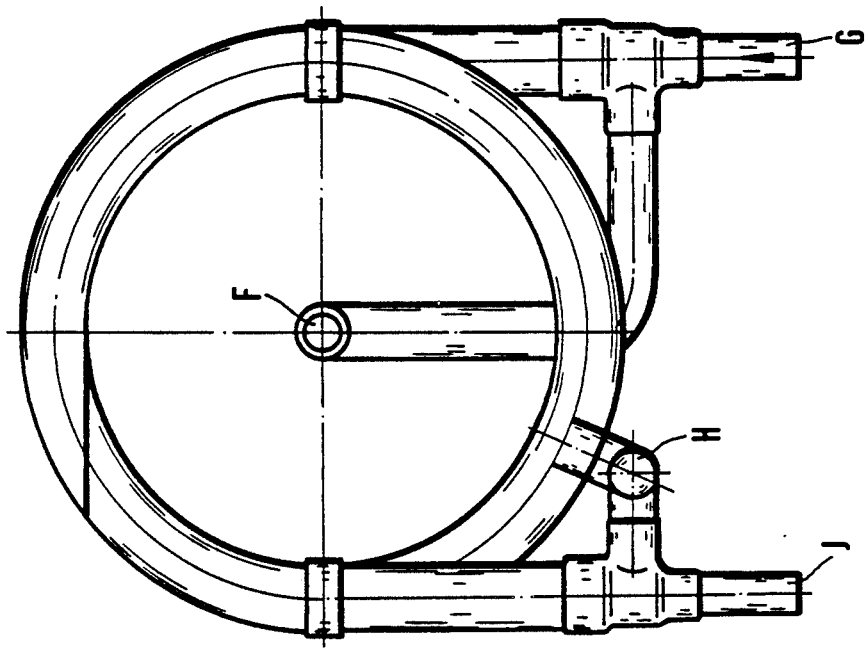
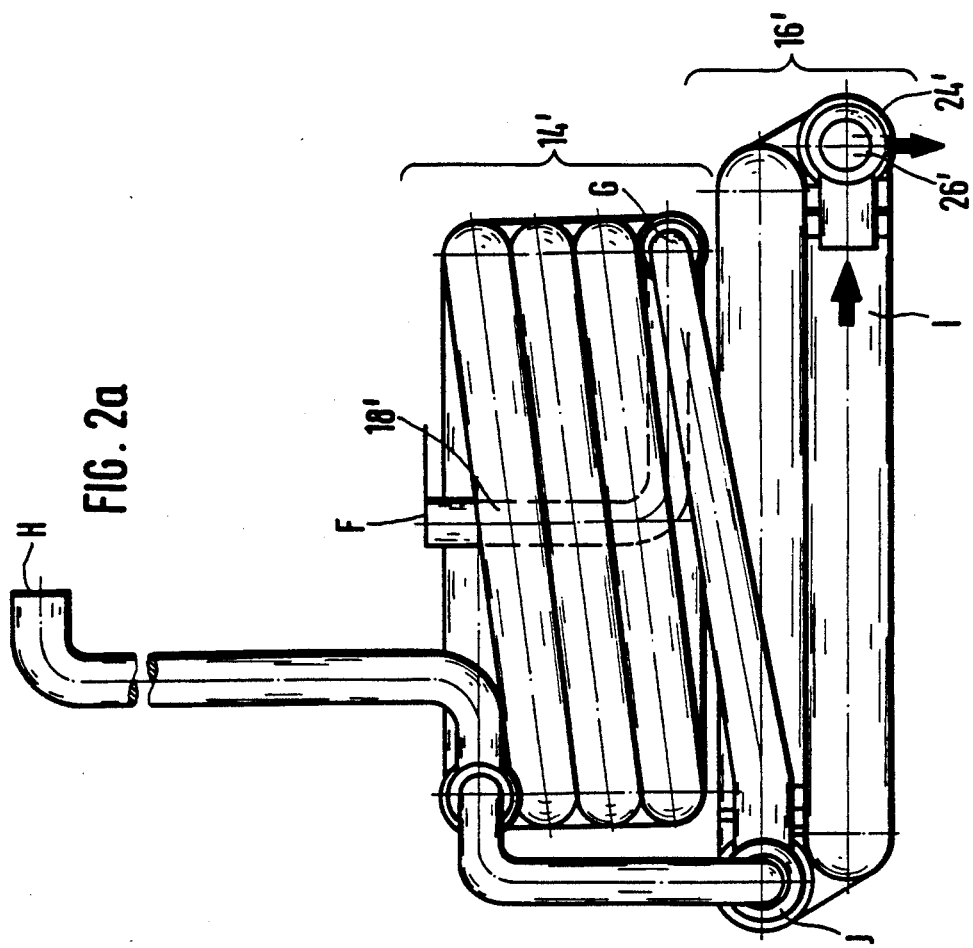

APPARATUS FOR PURIFYING LASER GAS

The invention relates to an apparatus for purifying laser gas.

In gas lasers, for example excimer lasers or $CO_2$ lasers, the laser gas becomes soiled in laser operation. The laser gas is stimulated by a gas discharge and contaminating gases and substances can be formed by chemical reaction, removal of material from the laser electrodes, reactions at the walls, etc.

The contaminating gases and substances impair the laser output. Particularly when operating a laser for a long time it becomes necessary to remove the contaminants from the laser gas.

In the prior art apparatuses for cleaning or purifying laser gas are known. For this purpose laser gas is led out of the resonator, transferred to a cleaning means and returned in a cycle in the cleaned state to the resonator.

However, conventional apparatuses for purifying laser gas are of insufficient effectiveness in particular with sensitive laser gases such as $F_2$, ArF, and at high pressures of more than 3.5 bar.

The invention is based on the problem of providing an apparatus for cleaning laser gas which gives a high purification degree and can be made and operated relatively economically.

The apparatus according to the invention for solving this problem comprises a first arrangement of first and second tubes in thermal contact, cooling medium flowing through the first tube and laser gas through the second tube so that the laser gas is cooled and cleaned, and a second arrangement of third and fourth tubes which are in thermal contact, the laser gas to be cleaned enters the third tube, the second tube opens into the fourth tube so that the cooled laser gas enters the fourth tube and the third tube opens into the second tube so that the precooled laser gas enters the second tube.

To achieve a particularly good and long thermal contact by a very efficient cooling of the laser gas to be cleaned in the first arrangement of two tubes, the latter are arranged coaxial, the first tube having a larger diameter than the second tube.

The same applies to the second arrangement of third and fourth tubes which are in thermal contact.

Liquid nitrogen is preferably used as cooling medium.

The aforementioned "first arrangement" can also be regarded as the "main cooling". In it, the laser gas is cooled to temperatures at which the contaminate and gases freeze out with high efficiency.

The aforementioned "second arrangement" of third and fourth tubes which are in thermal contact can be referred to as "precooling" because in it the laser gas to be purified is precooled before entry into the main cooling by means of the laser ga cooled in the main cooling.

In a preferred further development of the invention the first tube has a vertically aligned portion into which the cooling medium flows from a reservoir and which with its lower end opens into a helical portion of the first tube in which the cooling medium flows upwardly and is thereafter returned to the reservoir.

In this embodiment with a reservoir the nitrogen circulation does not require a pump because the density of the nitrogen depends on the temperature and a so-called "gravity feed" maintains the circulation.

Hereinafter examples of embodiment of the invention will be explained in detail with reference to the drawings, wherein:

FIGS. 2a and 2b show a further example of embodiment of such an apparatus; and

FIG. 1 shows a reservoir 10 for liquid nitrogen 12 as cooling medium.

Figure 1:
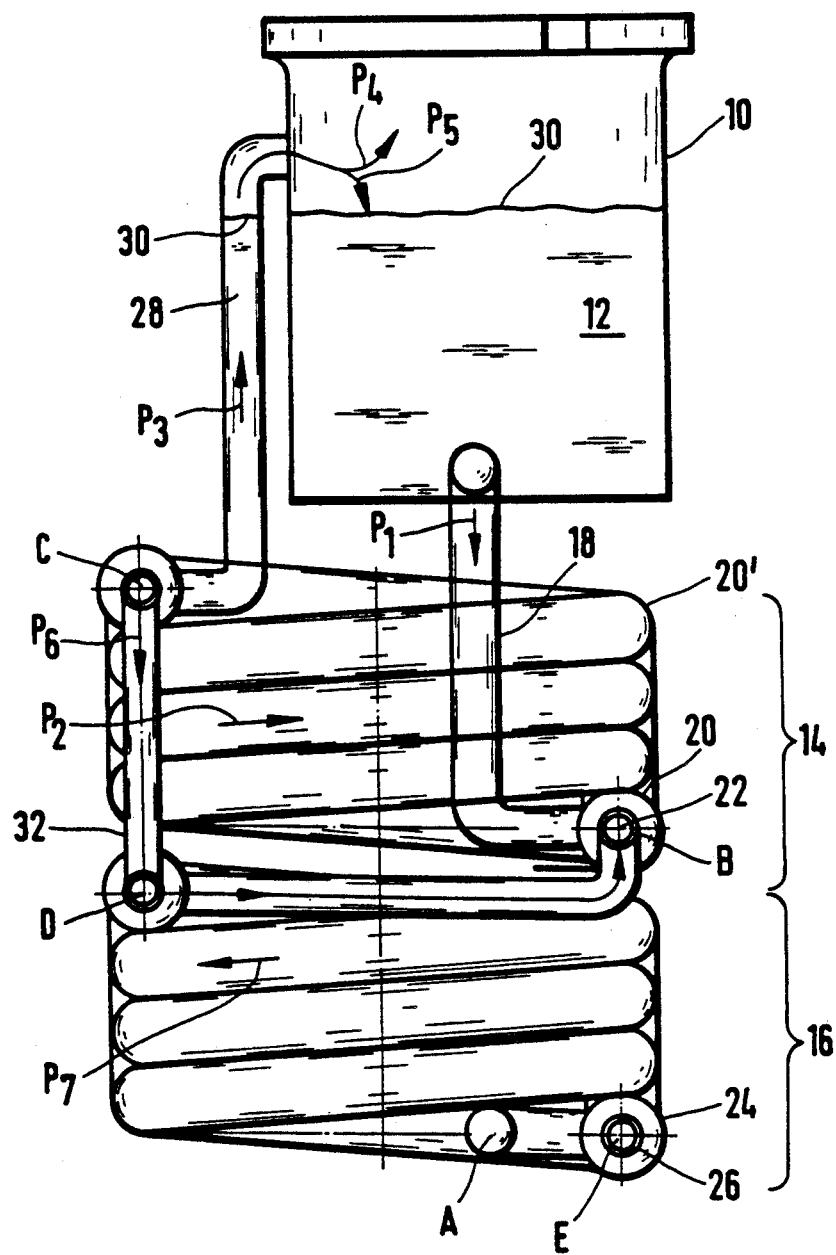
FIG. 1 shows a first example of embodiment of an apparatus for purifying laser gas.

The apparatus comprises besides the reservoir 10 a first arrangement 14 of tubes described in detail below and a second arrangement 16 of tubes likewise described in detail below.

In the first arrangement 14 the laser gas to be purified is brought by means of liquid nitrogen to extremely low temperatures to obtain an effective freezing out of contaminating gases and contaminating substances.

The first arrangement 14 may therefore be referred to as "main cooling".

In the second arrangement 16 a precooling of the laser gas takes place before entry into the first arrangement so that the second arrangement can also be referred to as "precooling".

Under the action of gravity liquid nitrogen 12 flows from the reservoir 10 into a vertical portion 18 of a first tube 20 which is part of the first arrangement 14 of tubes. The liquid nitrogen flows through the tube portion 18 downwardly in the direction of the arrow $P_1$ to the lowest point B of the first tube 20. The tube 20 is helical and coaxial with a second tube 22, the first tube 20 having a larger diameter so that a free space remains between the second and first tubes. In said free space the liquid nitrogen flows in the direction of the arrow $P_2$ in the helical portion 20' of the first tube upwardly and at the point C enters a vertically aligned tube 28 in which the liquid nitrogen rises in the direction of the arrow $P_3$ up to the liquid level 30 which is the same in the tube 28 and in the reservoir 10. Due to the heating nitrogen which has changed to the gaseous phase leaves the liquid phase in the direction of the arrow $P_4$ whilst the nitrogen which has remained liquid is returned in the direction of the arrow $P_5$ back to the liquid nitrogen 12 in the reservoir 10.

The laser gas to be cleaned is removed from the resonator (not shown) of the laser (not shown) for example by means of a pump and introduced at the point A into the second arrangement 16 of tubes. The second arrangement 16 consists similarly to the first arrangement 14 of two coaxially coiled tubes 24, 26, a free space remaining between the outer third tube 24 and the inner fourth tube 26. Into this free space the (hot, soiled) laser gas entering at the point A flows and flows further in the outer tube 24 upwardly to the point B where the laser gas enters the second (inner) tube 22 of the first arrangement 14. In the inner tube 22 the laser gas flows further upwardly in the direction of the arrow $P_2$ and due to the long and intensive interaction with the liquid nitrogen flowing in the outer jacket in the first tube 20 is cooled to such an extent that contaminations are frozen out.

At the point C the cooled laser gas leaves the first tube arrangement 14 and is led through the tube 32 in the direction of the arrow $P_6$ to the point D where it enters the inner tube 26 of the second tube arrangement 16. The cooled laser gas there flows downwardly in the direction of the arrow $P_7$ until it leaves the inner fourth tube 26 at the point E and is returned via a conduit (not shown) to the laser resonator (not shown).

On flowing in the direction of the arrow $P_7$ the cold laser gas cools the oppositely flowing hot laser gas entering the outer tube at A and itself is heated up.

FIGS. 2a and 2b show a further example of embodiment of an apparatus for purifying laser gas which is slightly modified compared with the example of embodiment of FIG. 1. FIG. 2a shows a side elevation and FIG. 2b a plan view of the actual freezing-out region, i.e. the first arrangement 14' of tubes in which the temperatures of the liquid nitrogen are effective.

From a reservoir (not shown) liquid nitrogen flows at the point F into the vertically aligned tube 18' and passes (corresponding to the example of embodiment of FIG. 1) at the point G into the outer jacket of the first arrangement 14' of tubes so that the liquid nitrogen rises upwardly in the helix and emerges at the point H. Gaseous nitrogen emerging at H passes into the outer atmosphere whilst nitrogen which has remained liquid is returned to the reservoir. To this extent this example of embodiment according to FIG. 2 corresponds to that of FIG. 1.

The hot (contaminated) laser gas flows at the point I into the outer jacket of the second tube arrangement 16', i.e. flows in the outer tube 24'. At G the precooled laser gas enters the actual freezing-out region and at the point J is returned into the inner tube 26' of the second tube arrangement 16' so that it can cool the hot laser gas flowing through the outer tube 24', itself thereby being heated up.

FIG. 2b shows a plan view from above of the tube arrangement 14' forming the actual freezing-out region.

Figure 3B:
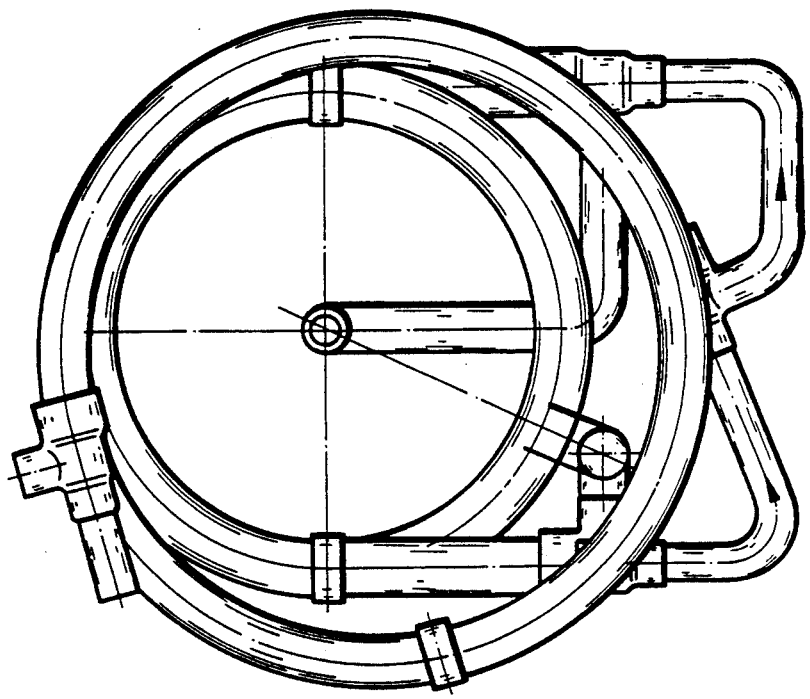
FIGS. 3a and 3b show a further modification of an apparatus for purifying laser gas.
Figure 3A:
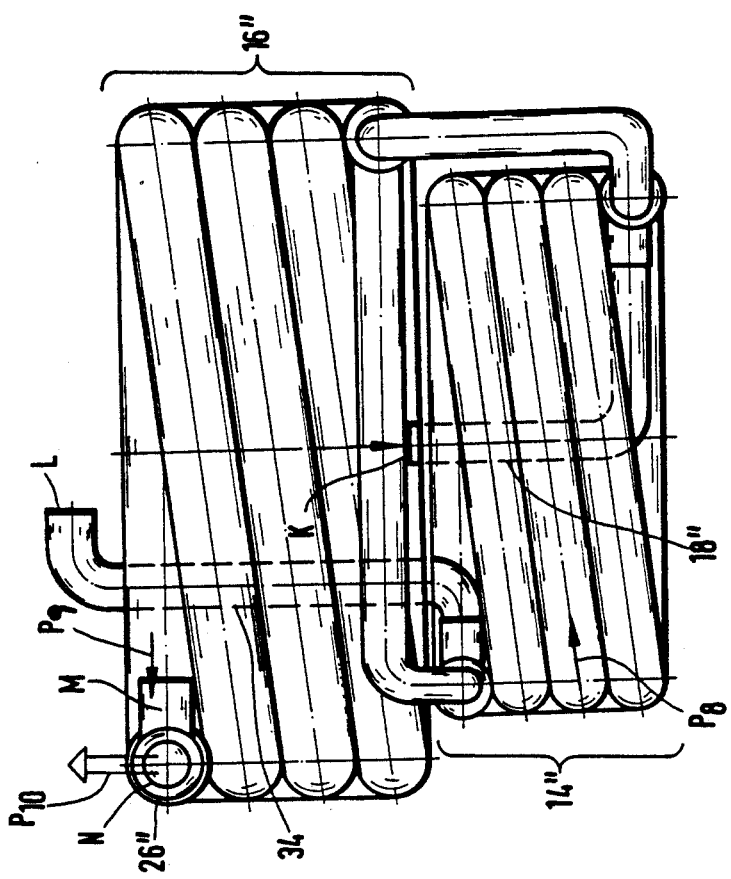

FIGS. 3a and 3b show a further example of embodiment of an apparatus for purifying laser gas in side elevation (FIG. 3a) and plan view (FIG. 3b). Here the first arrangement 14" of tubes in which the actual cooling of the laser gas to temperatures of the liquid nitrogen takes place is arranged beneath the second tube arrangement 16" in which a precooling of the laser gas is carried out.

At the point K liquid nitrogen is fed under gravity from a reservoir which is not shown and which is accommodated within the second tube arrangement 16'', passes into the vertically aligned tube 18" and rises in the outer jacket of the first tube arrangement 14" in the direction of the arrow $P_8$. The liquid nitrogen thereafter passes into the vertically arranged tube 34 and emerges at L, the liquid and gaseous nitrogen phases being separated in accordance with the examples of embodiment described above. Nitrogen which has remained liquid re-enters the reservoir.

At the point M hot unpurified laser gas enters the second tube arrangement 16" in the direction of the arrow $P_9$ and flows downwardly in the outer jacket thereof. The laser gas thus cooled by precooled laser gas flowing in the opposite direction in the first tube arrangement 14" flows in the direction of the arrow $P_{10}$ out of the tube 26" at N and is returned to the resonator of the laser.

We claim:

1. An apparatus for purifying laser gas, comprising:
   (a) a first arrangement comprising a first tube and a second tube, said first and second tubes being in thermal contact with each other, wherein a cooling medium flows through the first tube and wherein a precooled contaminated laser gas to be cleaned, obtained from a third tube, flows through the second tube so that the precooled contaminated laser gas is further cooled by heat exchange in the second tube to thereby condense out the contaminants of the cooled contaminated laser gas, and;
   (b) a second arrangement comprising said third tube and a fourth tube, said third and fourth tubes being in thermal contact with each other, wherein said second tube is in flow communication with said fourth tube and said third tube is in flow communication with said second tube, wherein a contaminated laser gas to be cleaned flows through the third tube and is cooled by heat exchange in the third tube by the cooled laser gas in the fourth tube to form the precooled contaminated laser gas, and wherein the precooled contaminated laser gas cooled in the third tube flows into the second tube.

2. An apparatus as defined in claim 1, wherein the cooling medium comprises liquid nitrogen.

3. An apparatus as defined in claim 1, wherein the first and second tubes are in a coaxial relationship.

4. An apparatus as defined in claim 3, wherein the first tube has a larger diameter than the second tube.

5. An apparatus as defined in claim 1, wherein the third and fourth tubes are in a coaxial relationship.

6. An apparatus as defined in claim 5, wherein the third tube has a larger diameter than the fourth tube.

7. An apparatus as defined in claim 1, wherein a reservoir for the cooling medium is connected to the first tube.

8. An apparatus as defined in claim 7, wherein the first tube has a vertically aligned portion into which the cooling medium flows from the reservoir and which at its lower end opens into a helical portion of the first tube in which the cooling medium flows upwardly and is thereafter returned to the reservoir.

* * * * *